Aug. 28, 1951 J. TAYLOR ET AL 2,565,634
MANUFACTURE OF INSULATED ELECTRIC CONDUCTORS
Filed May 15, 1946 3 Sheets-Sheet 1
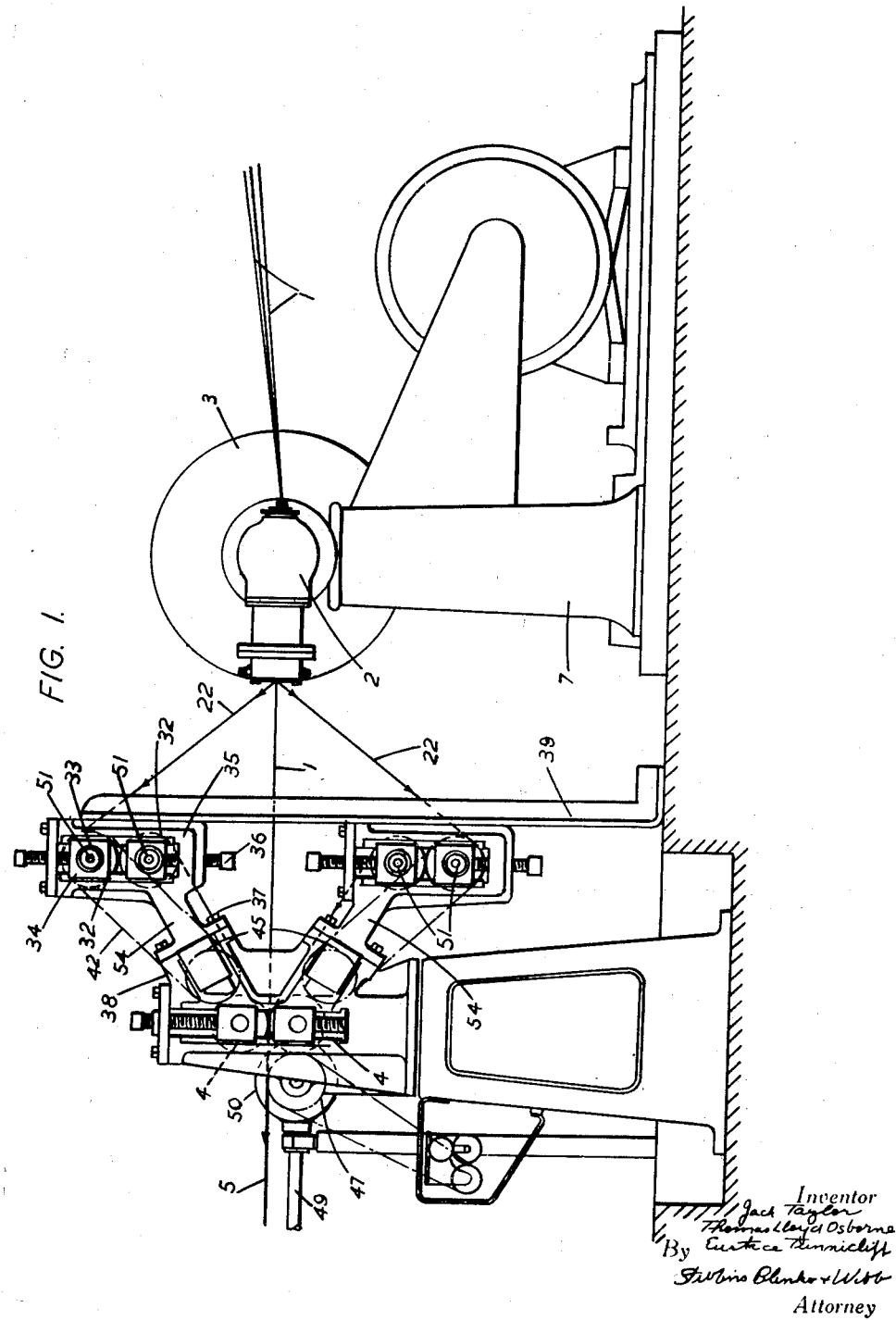

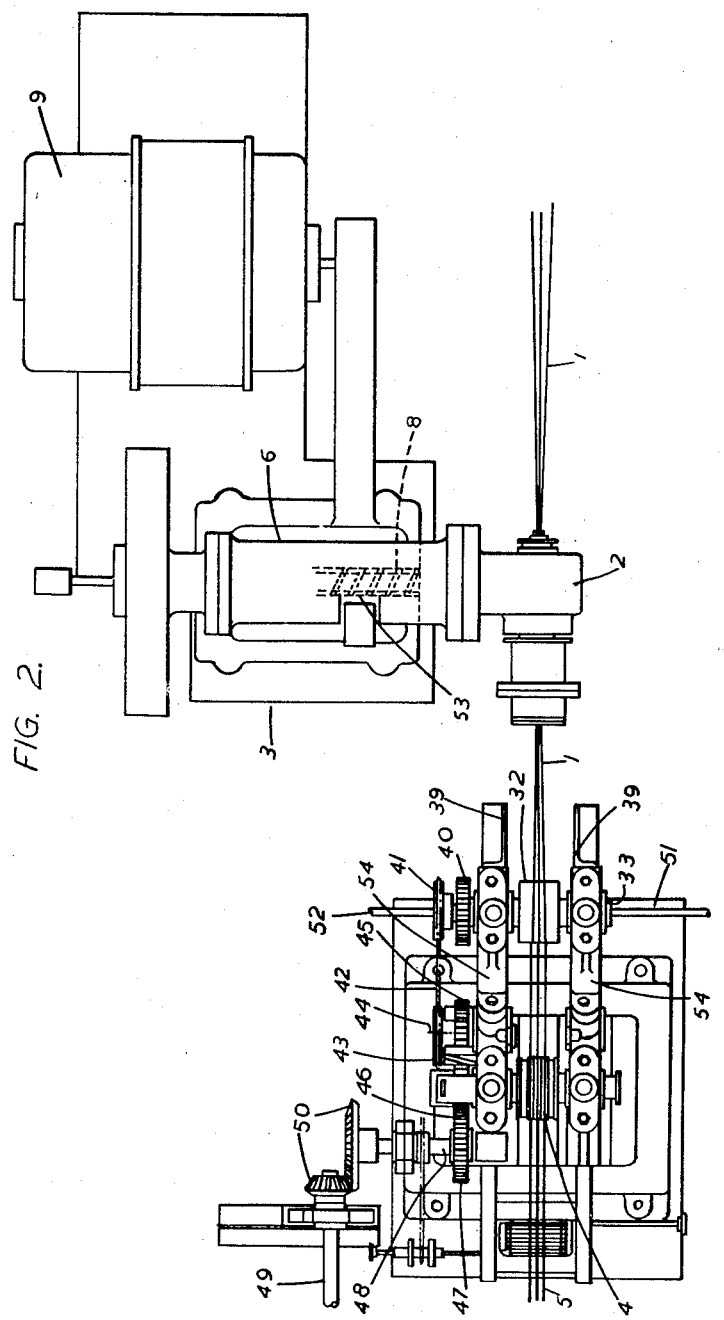

Aug. 28, 1951   J. TAYLOR ET AL   2,565,634
MANUFACTURE OF INSULATED ELECTRIC CONDUCTORS
Filed May 15, 1946   3 Sheets-Sheet 3
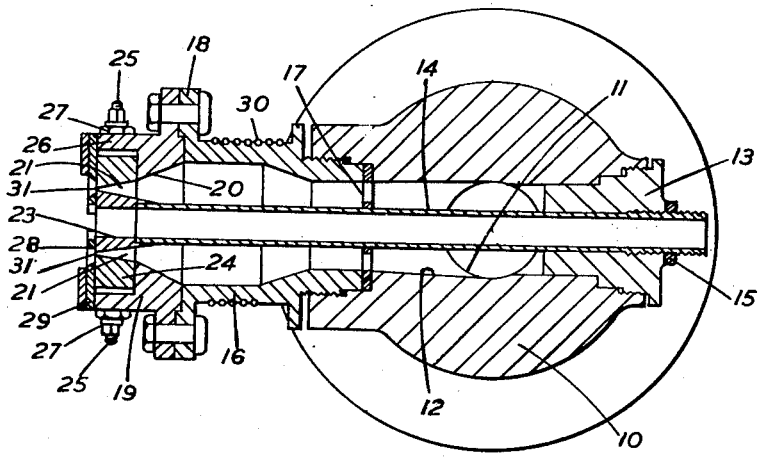
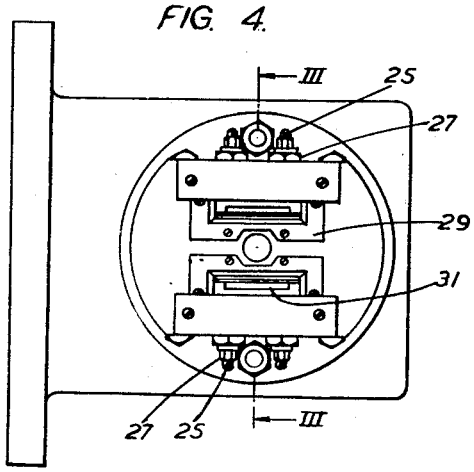

Patented Aug. 28, 1951

2,565,634

UNITED STATES PATENT OFFICE 2,565,634

MANUFACTURE OF INSULATED ELECTRIC CONDUCTORS

Jack Taylor, Thomas Lloyd Osborne, and Eustace Tunnicliff, Leigh, England, assignors to British Insulated Callender's Cables Limited, London, England, a British company Application May 15, 1946, Serial No. 669,778
In Great Britain June 8, 1945

2 Claims. (Cl. 154—2.27)

This invention is concerned with the application to electric conductors of coverings by the longitudinal method. In this method a number of wires (which may advantageously be large of the order of 20 to 50) to be covered is passed with two strips of unvulcanised rubber compound, or other plastic material, between a pair of grooved rolls. The grooves in these rolls are of semicircular form and the grooves of the two rolls register and combine to form a series of circular apertures through each of which passes a conductor with a layer of plastic material round it, the top half of the covering being formed from one strip and the bottom half being formed from the other strip. Between the grooves are plain cylindrical surfaces which are very forcibly pressed together (forming the "crushes") so that the thickness of the material between them is very much reduced, the bulk of it being forced laterally into the grooves. The effect of the passage of the strips and wires through the nip of the grooved rolls is to cause the two adjacent parts of the top and bottom halves of the covering of each wire to join together to form a seam owing to the high compression to which they have been subjected and to cause the parts between the covered conductors to be so much attenuated that they are readily torn and the covered wires thereby separated.

The invention provides a new combination of steps of procedure in this longitudinal method whereby improved results are obtained, particularly in cases where a thin covering, for instance 25 mils or less, is to be applied at each pair of grooved rolls. The invention is applicable both to natural rubber compounds, to artifical rubber and to rubber substitutes as now used for the coverings of wire. Its application is of more advantage with some of these materials than with others.

In this new combination of steps of procedure two strips of plastic material are simultaneously extruded by an extrusion machine appropriate for this work in a form thicker and narrower than the strip required for the coverings at the grooved rolls and each strip is then subjected to a hot rolling treatment between smooth rolls (that is rolls without ribs) in which it is annealed and changed to the smaller thickness and greater width required at the grooved rolls and then passes to those rolls. The hot rolling treatment also ensures that each strip is at the required temperature and has the required degree of plasticity to obtain propr amalgamation of the strips at the grooved rolls.

The apparatus for carrying out the improved process comprises an extrusion machine (or machines) provided with a head (or heads) adapted to deliver two strips of plastic material spaced one above the other, with provision for a set of wires to travel forward between the two strips without touching them. It also comprises two pairs of annealing and forming rolls, one pair being placed above the line of travel of the wires and the other pair below it, and a pair of grooved rolls which receive the wires and the strips. The annealing and forming rolls have the form of smooth cylinders (that is rolls without ribs) and have means for maintaining them at the required temperature, and means for driving them positively at the same surface speed as the effective surface speed of the grooved rolls.

The invention will be described further with the aid of the accompanying drawings which illustrate, diagrammatically, one form of apparatus, by way of example, suitable for carrying out the method.

Figure 1 is a side elevation of the apparatus,

Figure 2 is a plan of Figure 1.

Figure 3 is a section taken on the line III—III of Figure 4 and looking in the direction of the arrows, and Figure 4 is an end elevation of the extrusion head shown in Figure 3, looking at the front end of the head.

Referring first of all to Figures 1 and 2, the wires 1 to be covered are drawn through the head 2 of an extrusion machine 3 and from the front end of the head they pass straight to the nip of a pair of grooved rolls 4 of a longitudinal covering machine where the covering material is applied to each wire to enclose it in a closely fitting envelope. The numeral 5 indicates the wires after they have been covered.

The extrusion machine 3 generally, is of the kind used for the extrusion of rubber compounds and comprises a horizontally disposed cylinder 6 mounted upon a pedestal 7 and containing a screw 8 driven from an electric motor 9 through reduction gearing. The covering material to be extruded is fed into the interior of the cylinder 6 through an aperture 53 in the upper part thereof and the rotation of the screw compels the material to travel along the cylinder and into the head 2.

Referring now to Figure 3, the extrusion head comprises a body portion 10 which is bolted on is of uniform thickness across the width. The rolls 32 also ensure that each strip is at the required temperature and has the required degree of plasticity to obtain proper amalgamation of the strips at the grooved rolls. The strips after being passed between the nip of the smooth rolls enter the nip of the grooved rolls 4 of the longitudinal covering machine, one strip entering the nip from above the wires 1 and the other strip entering the nip from below the wires. The two pairs of smooth rolls maintain the strips 22 out of contact with the wires 1 until the latter arrive at the grooved rolls 4.

As will be seen from Figure 1 the two pairs of smooth rolls 32 are disposed between the extrusion machine 3 and the grooved rolls 4 of the longitudinal covering machine. The extrusion machine generally, will be so disposed with respect to the longitudinal covering machine that the longitudinal axis of the head 2 lies in the same vertical plane of the transverse axes of the grooved rolls 4 and the smooth rolls 32 will generally be so disposed that the vertical plane of the transverse axes of one pair coincides with the vertical plane of the transverse axes of the other pair, the vertical plane containing the transverse axes of the four smooth rolls coinciding with the vertical plane containing the transverse axes of the grooved rolls 4 and the longitudinal axis of the head 2. With such an arrangement the strips are not deflected laterally as they travel from the head of the extrusion machine to the nip of the grooved rolls 4. One pair of smooth rolls 32 is mounted above the wires 1 travelling from the front end of the head 2 to the nip of the grooved rolls 4 and the other pair of smooth rolls is mounted below the wires. Preferably, the two pairs of rolls are mounted symmetrically with regard to the path of the wires between the head 2 and the grooved rolls, with the longitudinal axes of the rolls in the same vertical plane. Conveniently, the two pairs of smooth rolls 32 are arranged about midway between the head and the grooved rolls 4.

The mounting of each pair of smooth rolls 32 and the arrangement for positively driving each pair are the same in each case so that a description of the mounting and driving of one pair will suffice.

Each smooth roll 32 of a pair is mounted upon a shaft 33 supported at its ends by bearing blocks 34 vertically slidable in frames 35 by screws 36, the two smooth rolls being mounted between two frames 35. These frames have forwardly projecting brackets 54 integral therewith. In the case of the upper pair of smooth rolls the brackets extend both forwardly and downwardly. In the case of the lower pair of smooth rolls the brackets extend forwardly and upwardly. These brackets are fixed as by bolts 37 to rearwardly extending bracket portions 38 of the longitudinal covering machine. The smooth rolls are further supported by vertical supports 39 to which the frames 35 are fixed.

The two shafts 33 upon which the smooth rolls are mounted are coupled together by gear wheels 40, a gear wheel being mounted upon each shaft. The upper shaft has mounted upon it a chain wheel 41 which is driven by a chain 42 from a sprocket 43 carried by a shaft 44. Upon the latter is also mounted a gear wheel 45 meshing with a gear wheel 46. Each of the shafts upon which the grooved rolls 4 are mounted has a gear wheel 46, the two wheels meshing with each other. The lower of these wheels is driven by a gear wheel 47 mounted on a shaft 48 which is driven from a main driving shaft 49 through reduction gearing 50.

It will be understood of course that means will be provided for feeding the wires to be covered to the extrusion machine and for taking up the covered wires.

Additional guiding or supporting means may be provided where found necessary or desirable between the extrusion and the smooth forming rolls or between the latter and the grooved covering rolls.

The smooth rolls 32 determine what will be the dimensions of the strips at the grooved rolls. The shape in cross-section of the strips as extruded from the extrusion head, therefore, may vary. The following figures are given merely by way of example to indicate the possible change of width of a strip which may take place between the extrusion head and the grooved rolls. In this example it is assumed that 18 conductors are to be covered and that each conductor consists of three wires stranded together, each wire having a diameter of 0.029 inch. Two strips each 4 inches in width is sufficient to enclose each of the conductors in a closely fitting envelope of the covering material, the overall diameter of each covered wire being 0.140 inch or less. The thickness of each strip after it has been subjected to the hot rolling treatment and before it has passed through the nip of the grooved rolls will approximate to the wall thickness of the covering in the finished product. The width of each strip as extruded may be 1 inch.

The uniformity of thickness of the strips obtained by the hot rolling of the strips prior to their entry of the nip of the grooved rolls of the longitudinal covering machine is of great importance for ensuring balanced conditions at both sides of any one wire being covered when excess covering material is being forced from the crushes at the two sides of the wire into the circular space formed by two registering grooves at the nip. It is also of importance in ensuring uniform conditions for each wire of a large number passing simultaneously side by side between the rolls. The ensuring of these conditions, according to the applicant's experience cannot be obtained by the use of grooved and ribbed rolls for pre-forming the strip to the grooves of the covering rolls. The forming rolls must be smooth uniform cylinders so as to present uniform flat strips to the covering rolls. They must also be driven positively at the same surface speed as the effective surface speed of the grooved covering rolls so as to avoid applying tension to the strip passing from the forming rolls to the covering rolls. The two strips of covering material may be extruded from two heads instead of from a single head.

What we claim as our invention is:

1. In the manufacture of covered electric wires by the longitudinal covering process and as a continuous operation, extruding simultaneously two strips of a material selected from the class of materials consisting of natural and artificial rubber and rubber substitutes as used for the covering of wires, each strip being of greater thickness than required for the longitudinal covering process, and giving to each strip the thickness and uniformity of thickness across its width and plasticity required for seaming in the longitudinal covering process by simultaneously heating and rolling each strip and then applying the strips to the wires by the longitudinal covering process, the extruding of the strips, heating and rolling and longitudinal covering, all being carried out simultaneously.

2. Apparatus for the continuous manufacture of covered electric wires by the longitudinal covering process, comprising in combination, grooved covering rolls having registering semicircular circumferential grooves, extrusion apparatus having a pair of oversize extrusion apertures of substantially uniform depth across their width for delivering simultaneously two strips of the covering material, pairs of smooth rolls placed respectively above and below the path of travel of the wires to the covering rolls, means for controlling the temperature of each pair of smooth rolls and means for driving each pair of smooth rolls at substantially the same effective surface speed as that of the grooved rolls.

JACK TAYLOR.
THOMAS LLOYD OSBORNE.
EUSTACE TUNNICLIFF.

REFERENCES CITED

The following references are of record in the file of this patent:

UNITED STATES PATENTS

| Number | Name | Date |
| --- | --- | --- |
| 252,262 | Sawyer | Jan. 10, 1882 |
| 692,012 | Heyl-Dia | Jan. 28, 1902 |
| 798,606 | Hawkins | Sept. 5, 1905 |
| 1,952,038 | Fischer | Mar. 20, 1934 |
| 2,177,660 | Kimble et al. | Oct. 31, 1939 |
| 2,361,374 | Abbott | Oct. 31, 1944 |
| 2,398,398 | Abbott | Apr. 16, 1946 |